INVENTOR.
LOUIS ALBERT PAUL RAIMBAULT

July 27, 1965  L. A. P. RAIMBAULT  3,197,230
STEERABLE TRAILER FOR HANDLING AND TRANSPORTING LOADS
Filed Jan. 16, 1963  2 Sheets-Sheet 2

INVENTOR.
LOUIS ALBERT PAUL RAIMBAULT

United States Patent Office 3,197,230
Patented July 27, 1965

3,197,230
STEERABLE TRAILER FOR HANDLING AND
TRANSPORTING LOADS
Louis Albert Paul Raimbault, Moulins, Allier, France,
assignor to Paul Raimbault & Cie, Moulins, Allier,
France, a society of France
Filed Jan. 16, 1963, Ser. No. 251,924
Claims priority, application France, Jan. 22, 1962,
885,543
5 Claims. (Cl. 280—99)

The present invention has the object of producing a device for the handling and transporting of loads that will be strongly built, simple and very easy to handle.

Another object of the invention is to enable the simultaneous guiding and locking of the two axles of the device along the same angle from one or the other of said axles.

Another object of the invention is to enable the length of the device to be regulated as a function of the length of the load.

Other objects and advantages of the invention will be revealed by the following description, the claims attached to the end of the description and the attached drawings, in which:

Figure 1:
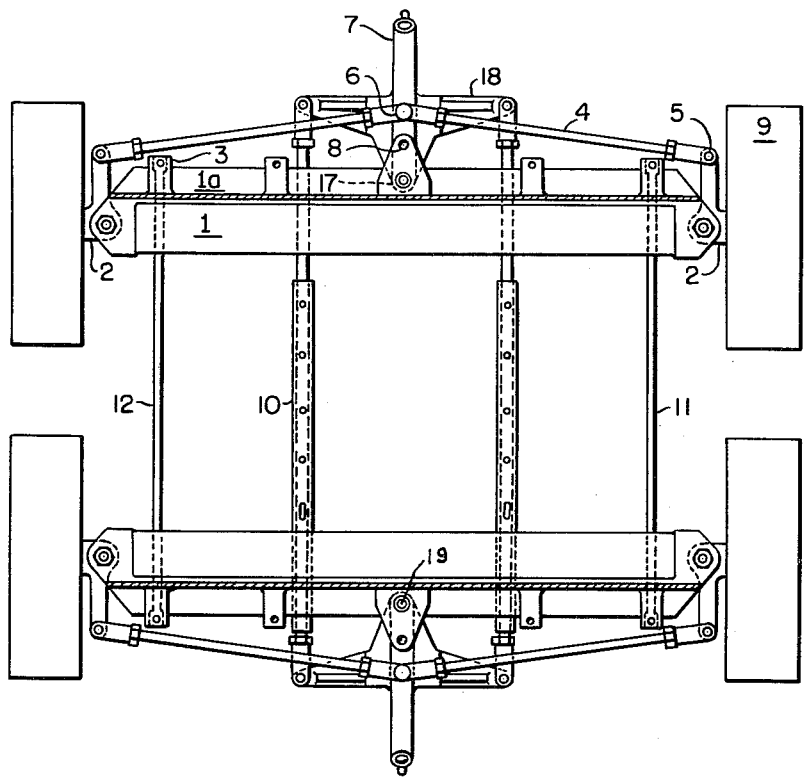
FIGURE 1 shows a plan view of a device constructed according to the invention.

As shown in FIGURE 1, the device according to the invention comprises a combination of two sets of swiveling wheels.

The front set consists of an axle formed by angle-bar 1 reinforced by means of a second angle-bar 1a locked on the former, as by means of rivets, screws or welding.

The wheels are pivotally attached to the axle by means of spindles 2 which are capable of being fixed to the axle either by means of a riveted or keyed pivot, or by means of a pivot screw enabling the spindle to be quickly dismantled.

The steering and positioning of the wheels are effected by means of small coupling connecting rods 4 attached to each spindle 2 by means of a spindle 5. The connecting rods are coupled by a spindle 6 to a cross-shaped part or bracket 7. An opening 8 through which a split pin 8a may pass permits the cross-shaped bracket to be fixed in a straight position, so as to impart a certain rigidity to the set. The bracket 7 is free to rotate about a pivot point 19 when the pin 8a is removed. The wheels 9 are mounted on bearings. These wheels can be enveloped in rubber or any other material, so as to facilitate running and make the latter silent.

The assembly of the device is composed of two sets similar to those described above and held together by means of linking rods 10, kinematically integral with the cross-shaped bracket 7.

These linking rods are made in a telescopic manner and formed by two coaxial tubes enabling the sets, or axle assemblies, to be fixed a certain distance apart. The regulating of this distance can be effected by means of aligned holes in the tubes through which pins or bolts may be passed to fix the adjustment of the tubes relative to one another, and thereby regulate the distance between the axle assemblies. The front and rear axle assemblies of the carriage are connected by means of bars 11 and 12. The end portions of bars 11 and 12 are received in sleeves 3 fixed to the axles. The sleeves and bars include aligned vertically extending openings. Pins or bolts received in these openings fix the bars to the sleeves, and in this manner fix the spacing of the two axle assemblies. Should it be desired to change the spacing of the axle assemblies, the bars 11 and 12 readily may be separated from the sleeves and axles, and bars of a different length attached between the axle assemblies after adjusting the telescoping linking rods. The number of bars may vary according to the load that will be placed on the carriage thus made up.

The wheels in FIGURE 1 are shown in a "straight ahead" position, that is, the planes of the wheels are perpendicular to the major axes of the axles, these axes extending lengthwise through the respective axles; the minor axes of the axles are perpendicular to these major axes and are thus parallel to the planes of the wheels when the wheels are oriented as shown in FIGURE 1.

Figure 1A:
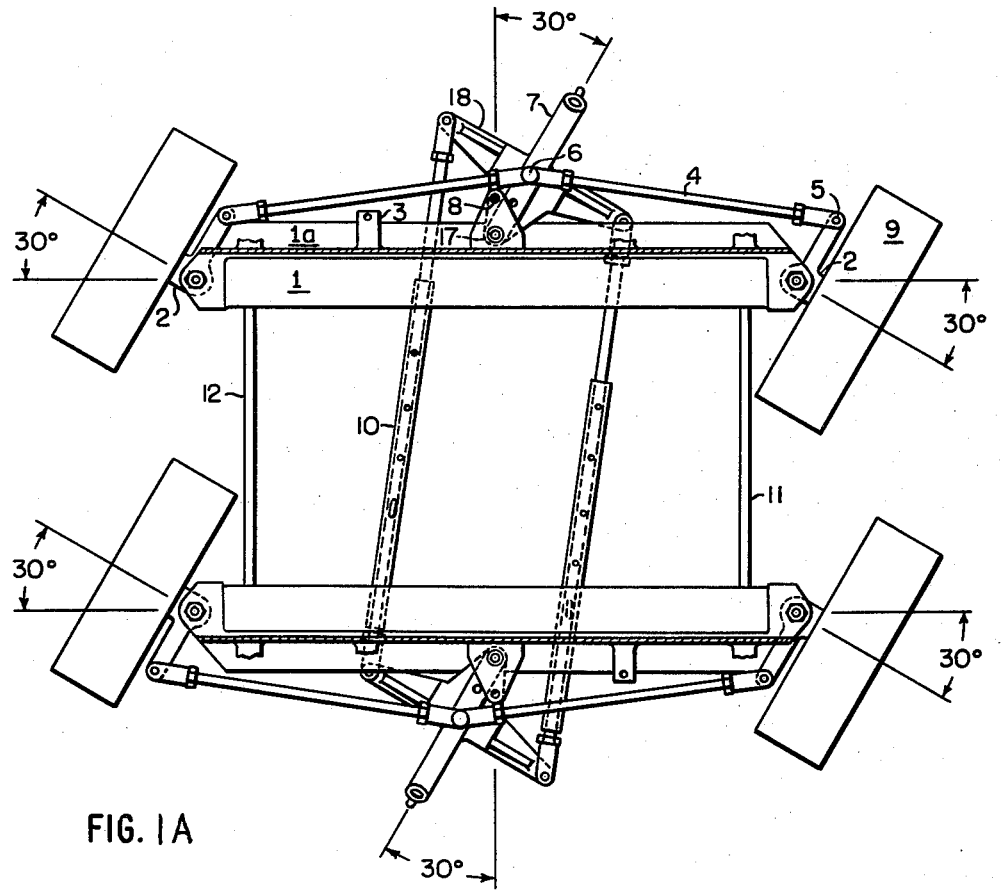
FIGURE 1A shows a plan view of the device when the wheels are turned through an angle of 30°.

FIGURE 1A shows a plan view of the device of FIGURE 1 when the wheels are turned through an angle of 30°. The means of effecting the turning will be described in detail in connection with FIGURE 2 of the drawings.

Figure 2:
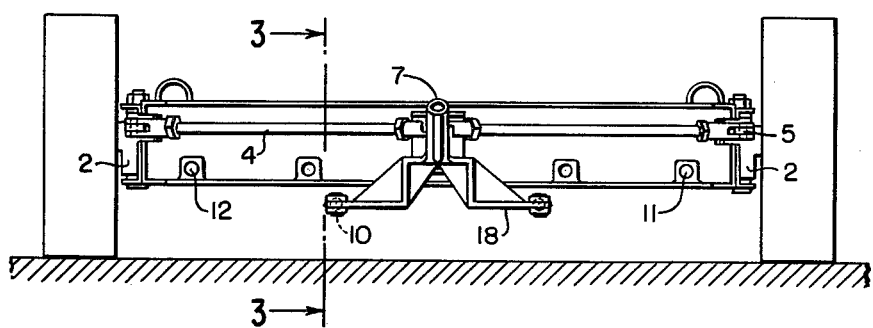
FIGURE 2 shows a front elevational view of the device according to the invention.

As shown in FIG. 2, steering is effected by a cross-shaped control bracket 7 to which is attached the connecting rods 4 and the telescoping linking rods 10. To steer the device, bracket 7 is pivoted. This pivoting motion is transmitted through the attached connecting rods 4 and spindles 5 to pivot the wheels 9 a similar amount. The telescoping linking rods 10 transmit the pivoting motion to the other bracket 7, so that both brackets and all four wheels move together and pivot the same amount, effecting joint steering. Accordingly, the device will move about a surface, yet will always maintain the same orientation. When it is desired to turn or change the orientation of the device, the brackets are fixed in a straight ahead position by pins 8a, and the device pulled in a conventional manner.

Figure 3:
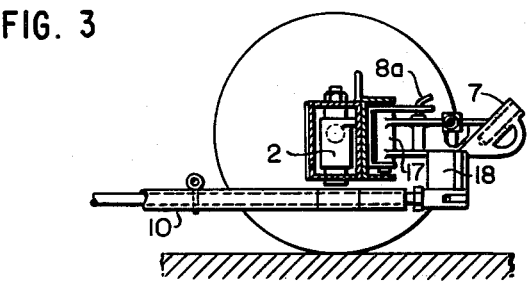
FIGURE 3 is a section along line 3—3 of FIG. 2.

In FIGURE 3, a detail is shown of the method of steering. In this figure, we see the spindle 17 on which the steering bracket pivots, either to right or left of the link of the small connecting rods by means of the spindle 18.

*Working of the device*

The article is loaded between the two elements so as to rest, on the one hand, on the coupling bars 11 and 12, and on the other, on the lugs 15 and 16 of the angle-bars 1.

The carriage thus formed can be very easily steered, seeing that the front and rear sets of wheels are similar and integral by means of the linking sets 1 of the carriage which can go either forward or backward.

The steering part can oscillate at an angle of 30° thus enabling the carriage to be manoeuvered on very restricted surfaces.

The present invention affords numerous advantages, among which are the following:

The carriage is very easy to handle, and has a very restricted movement surface, more particularly for corners;

The carriage is very strongly built; and

The coupling is very simple.

Of course, the invention is not restricted to the examples of embodiment described above, for which other methods and forms of embodiment can be provided without going outside of the scope of the invention for that purpose.

I claim:

1. A wheeled device for transporting loads comprising a pair of axles, each axle mounting a pair of wheels, means pivotally attaching the wheels to the ends of the axles, a bracket pivotally attached to each of the axles approximately midway between the wheels, means including connecting rods pivotally attached to the brackets and to said means pivotally attaching the wheels to the axle for pivotally attaching the wheels in the same direction and the same amount as the brackets;

a pair of telescopic linking rods pivotally attached to the brackets on either side of the pivot axes of said brackets and extending between the axles for transmitting pivoting motion of one bracket to the other bracket, each telescopic linking rod including a plurality of openings along the length of the rod which selectively may be aligned, and a pin extending through aligned openings to fix the relative adjustment of the telescopic rods and thus the spacing of the axles.

2. A wheeled device as set forth in claim 1 including a set of bars extending between and removably attached to the axles to fix the relative spacing of the axles.

3. A wheeled device as set forth in claim 2 in which said brackets are cross-shaped, said telescopic linking rods being pivotally connected to the arms of the cross, the cross-shaped brackets both rotating in the same angular sense about their respective pivot points when one of said brackets is rotated.

4. A wheeled device as set forth in claim 3 in which the cross-shaped brackets and the axles include openings which are aligned when the plane of the wheels is perpendicular to the major axis of the axle, whereby the position of the wheels may be fixed relative to the axles by passing a pin through the aligned openings in the brackets and axles.

5. A wheeled device for transporting loads comprising a pair of axles, each axle mounting a pair of wheels, means pivotally attaching the wheels to the ends of the axles, a bracket pivotally attached to each of the axles approximately midway between the wheels, means including connecting rods pivotally attached to the brackets and to said means pivotally attaching the wheels to the axles for pivoting the wheels in the same direction and the same amount as the brackets;

at least one telescopic linking rod pivotally attached to the brackets and extending between the axles for transmitting pivoting motion of one bracket to the other bracket, each telescopic linking rod including a plurality of openings along the length of the rod which selectively may be aligned, a pin extending through aligned openings to fix the relative adjustment of the telescopic rod and thus the spacing of the axles, and means extending between and removably attached to the axles to fix the relative spacing of the axles.

References Cited by the Examiner

UNITED STATES PATENTS

| | | | |
|---|---|---|---|
| 681,237 | 8/01 | Mason | 280—99 |
| 1,312,788 | 8/19 | Keller | 280—445 |
| 1,470,328 | 10/23 | Nabors | 280—99 |
| 1,925,712 | 9/33 | Campbell | 280—99 |
| 2,359,978 | 10/44 | Edwards | 280—91 |
| 2,412,927 | 12/46 | Thorn | 280—99 |
| 2,559,142 | 7/51 | Woodworth | 280—103 |
| 2,582,455 | 1/52 | Potter | 280—103 |

FOREIGN PATENTS

| | | |
|---|---|---|
| 790,217 | 5/35 | France. |
| 1,124,718 | 7/56 | France. |
| 572,010 | 3/33 | Germany. |
| 950,045 | 10/56 | Germany. |

A. HARRY LEVY, MILTON BUCHLER, *Examiners.*

BENJAMIN HERSH, *Primary Examiner.*

UNITED STATES PATENT OFFICE
CERTIFICATE OF CORRECTION

Patent No. 3,197,230                                                         July 27, 1965

Louis Albert Paul Raimbault

It is hereby certified that error appears in the above numbered patent requiring correction and that the said Letters Patent should read as corrected below.

Column 1, line 59, after "two" insert -- interfitting --; column 2, line 71, for "pivotally attaching" read -- pivoting --.

Signed and sealed this 8th day of March 1966.

(SEAL)
Attest:

ERNEST W. SWIDER                                       EDWARD J. BRENNER
Attesting Officer                                        Commissioner of Patents